United States Patent [19]

Junker

[11] Patent Number: 5,681,208
[45] Date of Patent: Oct. 28, 1997

[54] METHOD AND APPARATUS FOR GRINDING A CRANKSHAFT

[76] Inventor: Erwin Junker, Junkerstrasse 2, 77787 Nordrach, Germany

[21] Appl. No.: 596,102

[22] PCT Filed: Aug. 16, 1994

[86] PCT No.: PCT/EP94/02729

§ 371 Date: Feb. 12, 1996

§ 102(e) Date: Feb. 12, 1996

[87] PCT Pub. No.: WO95/05265

PCT Pub. Date: Feb. 23, 1995

[30] Foreign Application Priority Data

Aug. 18, 1993 [DE] Germany .................. 43 27 807.8

[51] Int. Cl.⁶ .............. B24B 1/00; B24B 7/19; B24B 7/30
[52] U.S. Cl. .............. 451/49; 451/381; 451/399
[58] Field of Search .............. 451/365, 364, 451/381, 397, 398, 399, 402, 49, 251, 249, 243, 142

[56] References Cited

U.S. PATENT DOCUMENTS

| | | |
|---|---|---|
| 1,993,543 | 3/1935 | Egger .............................. 451/49 |
| 3,059,514 | 10/1962 | Lindemann . |
| 3,098,328 | 7/1963 | Fournier .......................... 451/249 |
| 3,581,611 | 6/1971 | Lentz ............................. 451/397 |
| 3,583,108 | 6/1971 | Olishi et al. .................... 451/364 |
| 3,877,151 | 4/1975 | Roberts .......................... 451/49 |
| 4,419,845 | 12/1983 | Voigt et al. .................... 451/49 |
| 4,423,990 | 1/1984 | Kodama et al. ................ 451/49 |
| 4,870,786 | 10/1989 | Millay et al. ................... 451/398 |
| 4,932,642 | 6/1990 | Salenbien et al. . |
| 5,303,511 | 4/1994 | Tsuchiya et al. ............... 451/399 |
| 5,392,566 | 2/1995 | Wedeniwski .................. 451/251 |

FOREIGN PATENT DOCUMENTS

| | | |
|---|---|---|
| 0170764 | 2/1986 | European Pat. Off. . |
| 660950 | 6/1938 | Germany . |
| 727220 | 10/1942 | Germany . |
| 1084167 | 6/1960 | Germany . |
| 1258753 | 1/1968 | Germany . |

Primary Examiner—James G. Smith
Assistant Examiner—Derris H. Banks
Attorney, Agent, or Firm—Jordan and Hamburg

[57] ABSTRACT

An apparatus for grinding particularly a crankshaft is proposed, the apparatus having a workpiece headstock and a tailstock with, in each case, a bearing, which is disposed in the extension of the crankshaft axis and is intended to accommodate the crankshaft at its axial end points. Moreover, the workpiece headstock and the tailstock each have a spike, in which the crankshaft is mounted and fixed free of axial pressure.

12 Claims, 6 Drawing Sheets

Fig. 6
FIG. 6a)
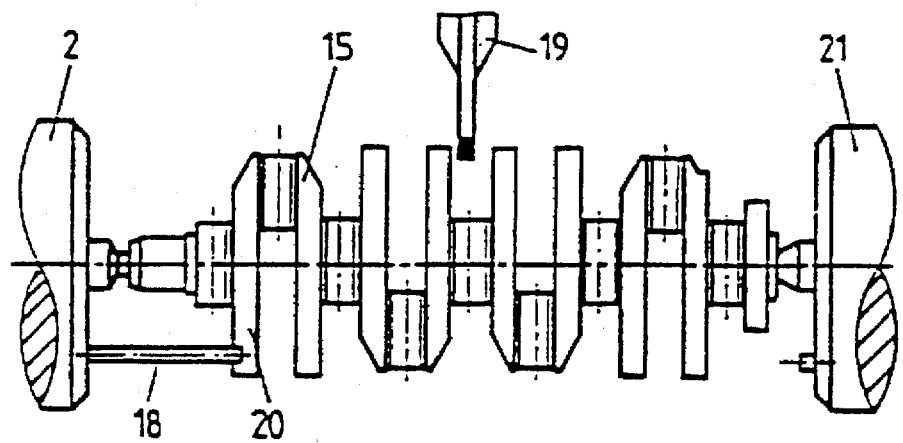
FIG. 6b)
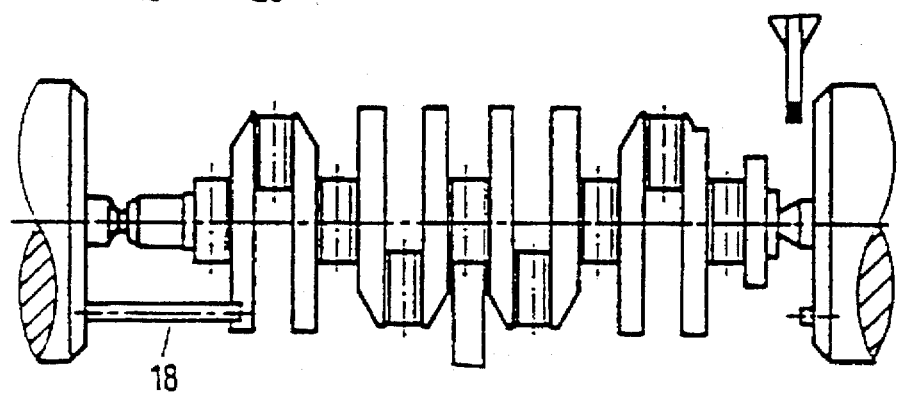
FIG. 6c)
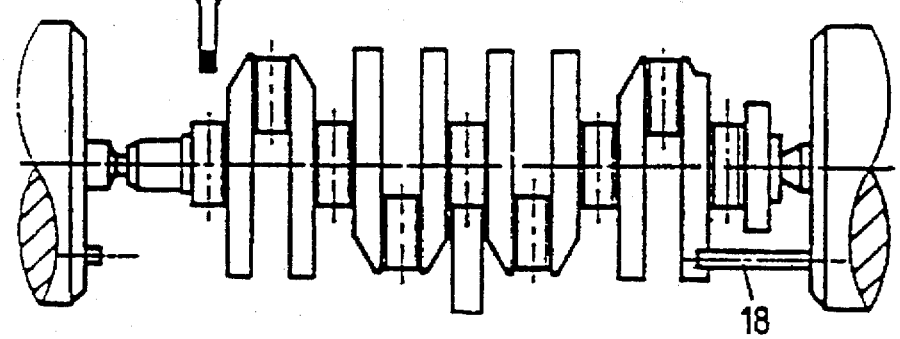
FIG. 6d)
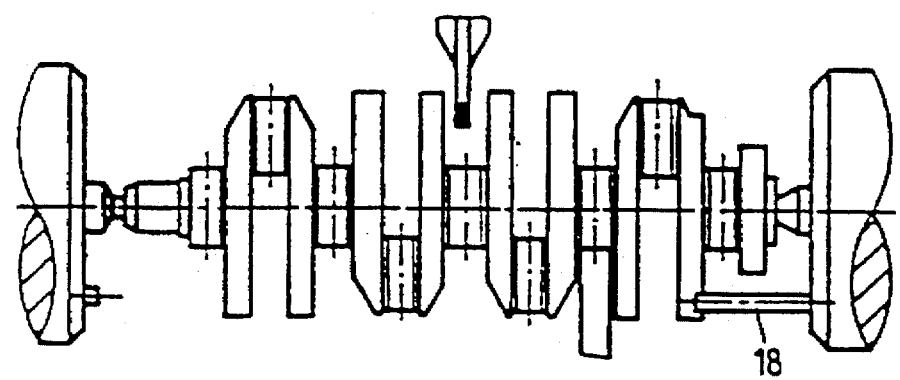

METHOD AND APPARATUS FOR GRINDING A CRANKSHAFT

The invention relates to a method and an apparatus for grinding a crankshaft.

In the case of known methods, crankshafts are ground in a plurality of steps. In a first step, the main bearings of the crankshaft are pre-ground and, in a second, the lifting bearings. The grinding of the main bearings is finished in a third step. The central bearing and the crankpin are ground in a subsequent fourth step. In further steps, the grinding of the lifting bearing is finished (fifth step). In a sixth step, the crankshaft ends are machined and, in a final seventh step, the flanges of the crankshaft are ground.

In the case of apparatuses known as such, the crankshaft is clamped at its ends between the workpiece headstock and tailstock by means of chucks or by means of collets and spikes. Such a clamping of the crankshaft admittedly provides the required, secure mounting even at high rotational speeds. However, it is associated with the serious disadvantage that the crankshaft is exposed to axial forces, which lead to its deformation in the elastic range. This does not always result in damage to the crankshaft. However, quality and accuracy problems arise due to the elastic deformation, since the crankshaft springs back elastically after it is unclamped. A further disadvantage of these apparatuses lies therein that the chuck or collet covers parts of the crankshaft, which are to be ground, particularly flanges and central bearings. In order to be able to grind also these parts of the crankshaft, the chucks or the collets must be loosened from the crankshaft and the latter must be removed from the apparatus. Finally, these parts of the crankshaft must be ground in a separate step. The known method for grinding crankshafts therefore is exceedingly time-consuming and expensive.

In the German patent 727 220, a clamping apparatus for crankshaft grinding machines is described, for which the crankpins are clamped without axial pressure in clamping jaws seated on a pivotable segment. This segment can be pivoted about a pin, which is removed from the center of a face plate by a distance corresponding to the magnitude of the stroke. Moreover, further details concerning the mounting of the crankshaft are not given in this patent.

SUMMARY OF THE INVENTION

It is therefore an object of the invention to provide a method and an apparatus of the type, which enables the whole of the crankshaft to be ground in one clamping without or without significant axial forces.

The inventive apparatus is associated with a plurality of advantages. One significant advantage consists therein that the crankshaft, which is to be ground, can be clamped centrically between spikes, so that it does not deform in the axial direction. This advantage is supplemented by the further advantage that the whole surface of the crankshaft, in the planned clamped position in which it is free of axial pressure or under a slight, defined, axial tension, is accessible to the grinding tool, which comprises at least two separately mounted and appropriately contoured grinding disks.

The crankshaft is clamped into the apparatus, with a defined, slight axial tension and, so firmly, that it is held securely even at high rotational speeds. This is true also for crankshafts with eccentric parts of any mass. Due to the clamping under a defined, slight axial tension and without axial pressure, all the parts of the crankshaft, which are to be ground, are accessible to the grinding tool. Accordingly, the grinding of the crankshaft is completed with a single clamping.

The inventive apparatus is also not complicated technically and can be maintained easily.

BRIEF DESCRIPTION OF THE DRAWINGS

Further advantages arise out of the following explanation of the invention by means of examples and the enclosed drawing.

FIGS. 6a to 6d show a partial view of the apparatus with a clamped crankshaft, with connecting pins and a grinding tool, the positions of the grinding disks used being indicated in different machining stages.

DETAILED DESCRIPTION OF THE INVENTION

Figure 1:
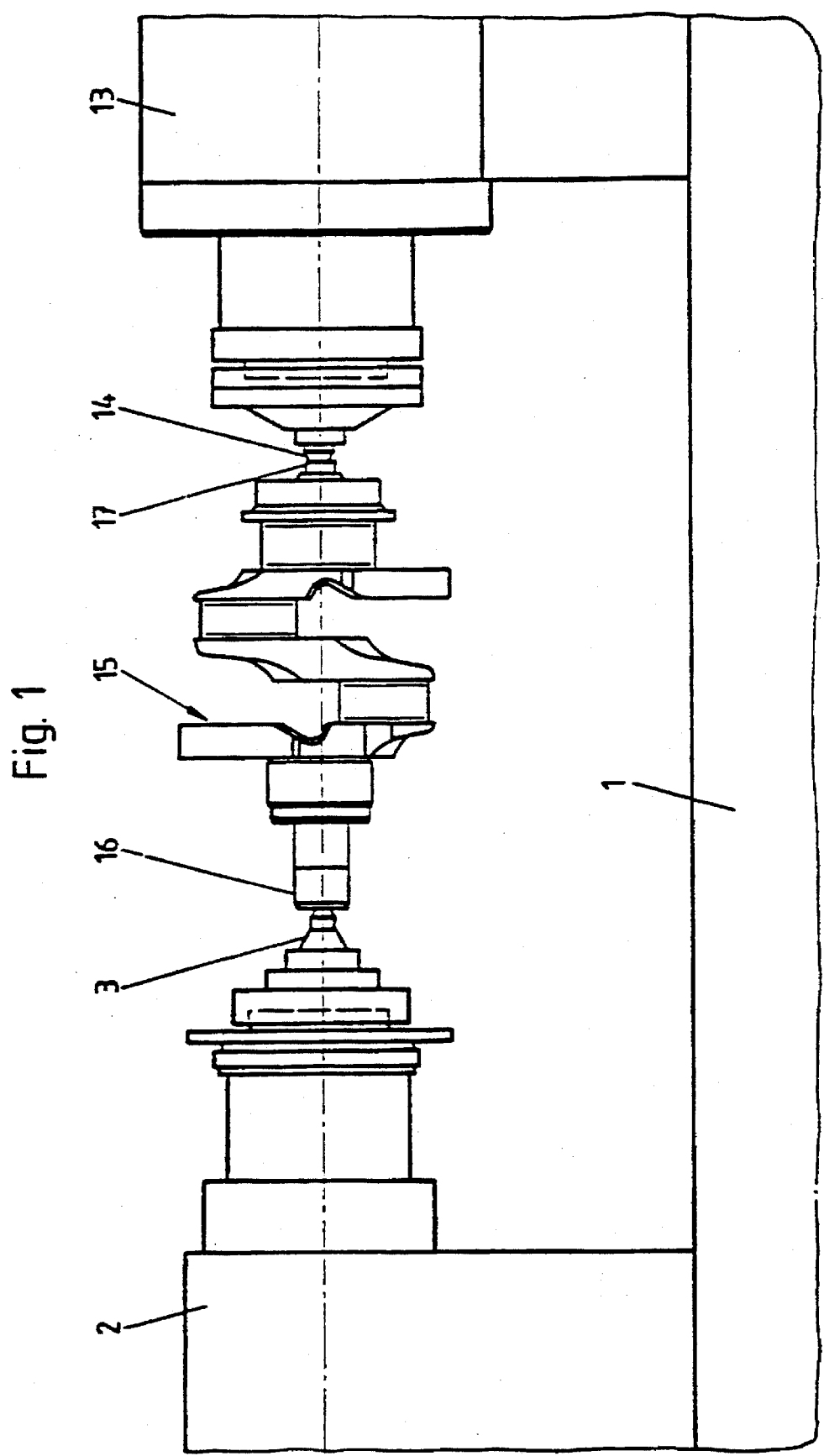
FIG. 1 shows an apparatus with a clamped crankshaft.
Figure 2:
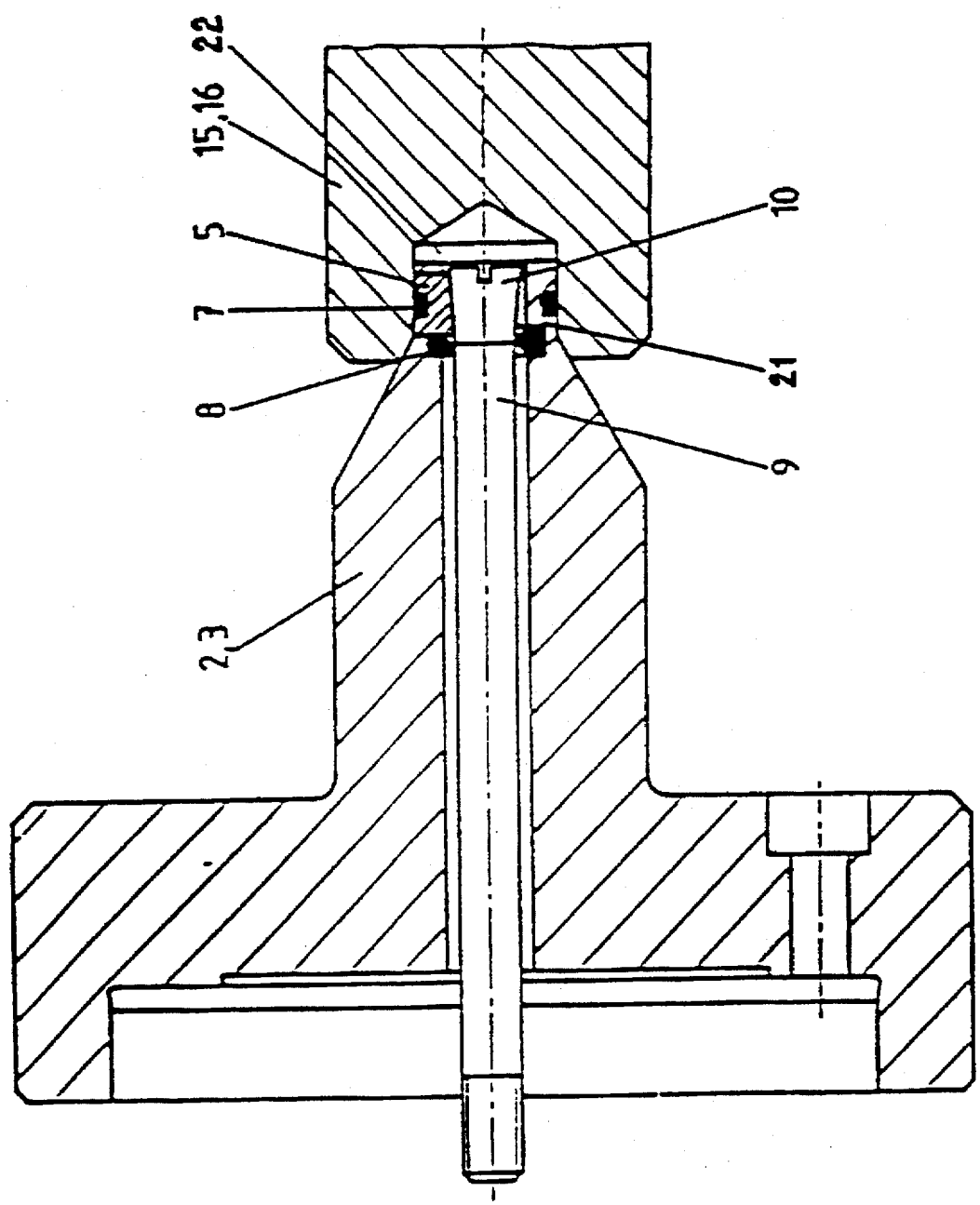
FIG. 2 shows a partial section of the apparatus of FIG. 1 with a clamped crankshaft and a clamping element.
Figure 3:
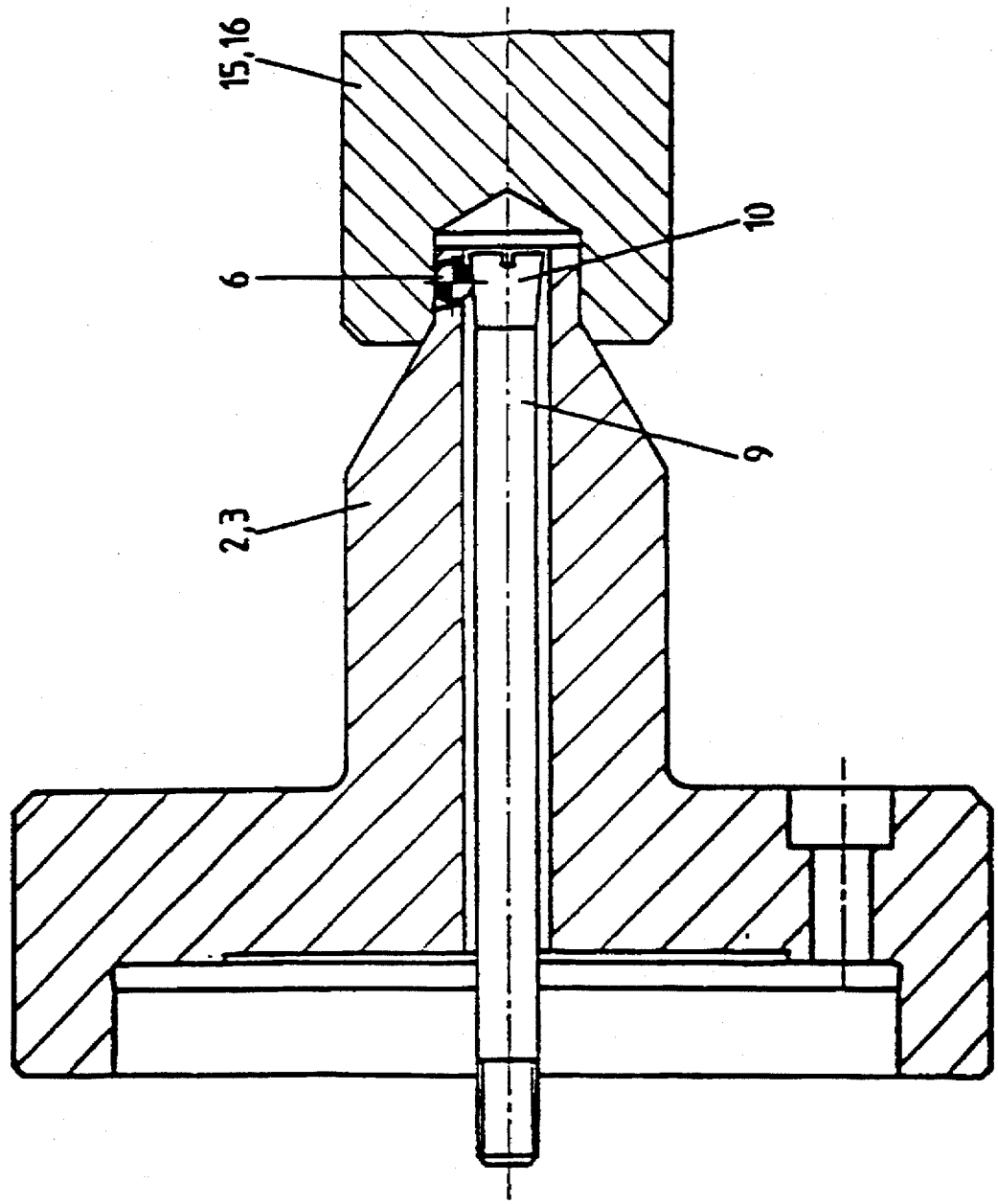
FIG. 3 shows a partial section through a further embodiment of the apparatus of FIG. 1 with a clamped crankshaft, FIG. 4 diagrammatically shows an apparatus with a clamped crankshaft, which is pulled axially at the left side in the direction of the spike at the headstock side of the workpiece by means of a fastening element engaging a crankpin.

A grinding machine, shown in FIG. 1, consists of a table 1, a workpiece headstock 2 disposed on the table 1 and a tailstock 13 also disposed on the table 1. In a known manner, for example, the workpiece headstock 2 and the tailstock 13 have sleeves, which can be shifted horizontally, for example, by a hydraulic cylinder, which is not shown. A spike 3 is disposed at the workpiece headstock 2 and a spike 14 is disposed at the sleeve at the tailstock side. The design of the spikes 3 and 14 for preferred embodiments is shown in FIGS. 2 and 3 and described below. The crankshaft 15 is clamped at its headstock end 16 in the spike 3, while the tailstock end of the crankshaft 15 is clamped in the spike 14. The whole of the surface of the crankshaft 15, thus is accessible to grinding disks. At the same time, the crankshaft 15 is clamped and fixed between the spikes 3 and 14 without axial pressure or with a defined, slight, axial tension. An axial tension is then applied by a hydraulic cylinder, which shifts the sleeve.

FIG. 2 shows the design of the spike 3. Spike 14 can have an identical construction. The spike 3 of the workpiece headstock 2 is inserted into a corresponding central borehole 22 of the headstock end 16 of the crankshaft 15. Spike 3 has a cylindrical, longitudinal passage, in which a connecting rod 9, which acts in concert with a clamping element 4, is disposed. The clamping element 4 consists of at least three clamping jaws 5, which are distributed about the periphery of a section of the spike 3 engaging a respective crankshaft end, are disposed symmetrically, inserted in corresponding grooves; of the periphery of the spike 3 and held fast there. The connecting rod 9 is mounted in a floating fashion and shifted axially with the help of a hydraulic cylinder, which is not shown. In the region of the clamping element 4, the connecting rod 9 is constructed in the form of a cone or a truncated cone and tapers in the direction opposite to free end of 21 the spike 3.

In the case of the embodiment shown in FIG. 2, the clamping element 4 consists of the clamping jaws 5 which, in the case of an axial movement of the conical head part 10 of the rod 9 away from a headstock end 16 of the crankshaft 15, engage the borehole wall of the crankshaft 15, clamping the latter. The pressure exerted by the connecting rod 9 on the clamping jaws 5 and, with that, on the crankshaft 15 in the region of its recess corresponding to the spike 3, can be regulated by the horizontal positioning of the connecting rod 9 (in the Figure, to the left or to the right). At their external periphery, the clamping jaws 5 have recesses for accommodating a clamping ring 7. The clamping ring 7, as well as a further clamping ring 8, hold the clamping jaws 5 in the spike 3 and prevent a horizontal shifting of the clamping jaws 5; the clamping jaws 5 can be shifted only vertically, that is, perpendicularly to the axis of the crankshaft 15. These clamping rings 7, 8 preferably are rubber rings.

It follows from FIG. 2 that the crankshaft 15 can be connected firmly, by a pressure exerted perpendicularly to the crankshaft axis by the connecting rod 9 and the clamping jaws 5, with the workpiece headstock 2 or the tailstock 13. An axial pressure on the crankshaft 15 by the interaction of the tailstock 13 and the workpiece headstock 2 is not exerted or exerted only to an extent, which is considerably below the axial pressure in the case of known clampings of grinding apparatuses. Moreover, the axial pressure can be reduced owing to the fact that the sleeve of the tailstock 13 is made pressureless.

The clamping jaws 5 preferably are disposed symmetrically with respect to the periphery and offset in each case by 120° with respect to their center. The spike or the guiding end 21 of the workpiece headstock 2 or tailstock 13 is constructed so that it extends between two adjacent clamping jaws 5 into the central borehole 22 of the respective end of the crankshaft 15.

The workpiece is clamped with a defined, slight, axial tension. The floating mounting of the connecting rod 9 has been described; in this connection, the clamping jaws 5 serve to take hold of the crankshaft 15 radially and the radial guidance, while the spike is being introduced into the central borehole of the crankshaft 15, is taken over by the spike and the central borehole in the crankshaft 15 at a beveled transition region between the axial end face of the crankshaft 15 and the central borehole, which beveled transition region corresponds to the conical contour, for example of 60°, of the spike 3; in other words, the spike 3 and the truncated cone assume the centrical guidance of the crankshaft 15.

For the embodiment shown in FIG. 3, the clamping element consists of a clamping ball 6, which is crimped into the spike 3. The ball 6 and the connecting rod 9 with the truncated-cone head 10 interact in the same manner as do the clamping jaws 5 and connecting rod 9 of the first embodiment described by means of FIG. 2.

Figure 4:
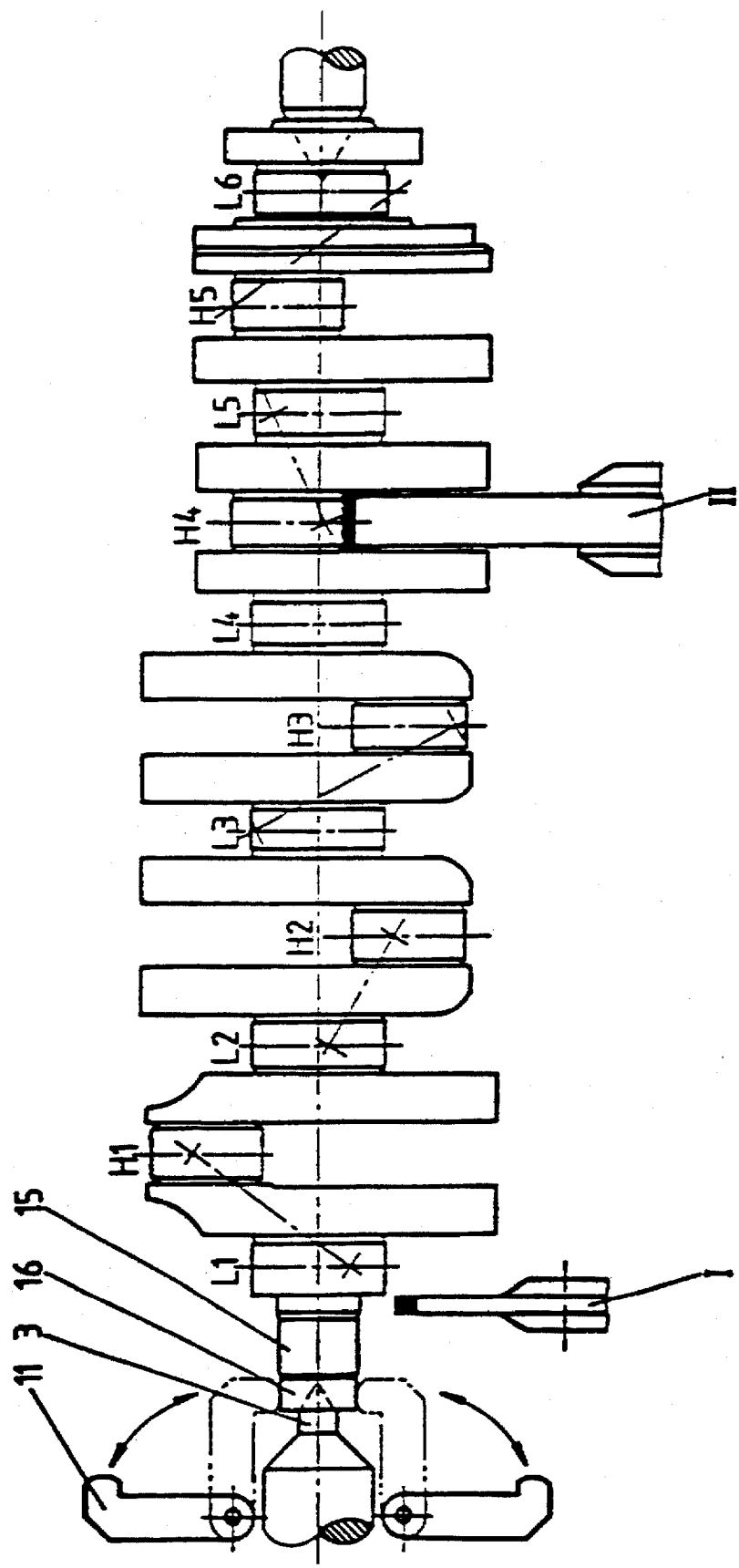

For the embodiment shown in FIG. 4, the apparatus has a fastening element 11, which is constructed as an external chuck, which can be pressed onto the headstock end 16 of the crankshaft 15. An external chuck can also be provided for the tailstock end 17 of the crankshaft 15 (FIG. 1). The chuck 11, pressed onto the crankshaft 15, supports the mounting without axial pressure or with a defined, slight axial tension and the fixing of the crankshaft 15, because it pulls the crankshaft 15 onto the corresponding spike. The chuck 11 is provided in the form of two clamping jaws, is mounted pivotably and, for example, in the position, which is shown in FIG. 4, and is moveable vertically away from the clamped position, making it possible to grind the crankshaft 15 also at its headstock end 16, which is covered by the chuck 11 in other steps of the grinding process.

As shown in FIG. 4, two different grinding disks I and II, which can be advanced and are contoured appropriately, are used to grind the crankshaft surfaces. For this purpose, the grinding disk I is guided so that not only the cylindrical end section of the crankshaft 15, but also its bearings L1, L6 and its radial surfaces can be ground with it. Grinding disk II grinds the remaining region of the crankshaft, the grinding of which can thus be completed in one clamping.

Figure 5:
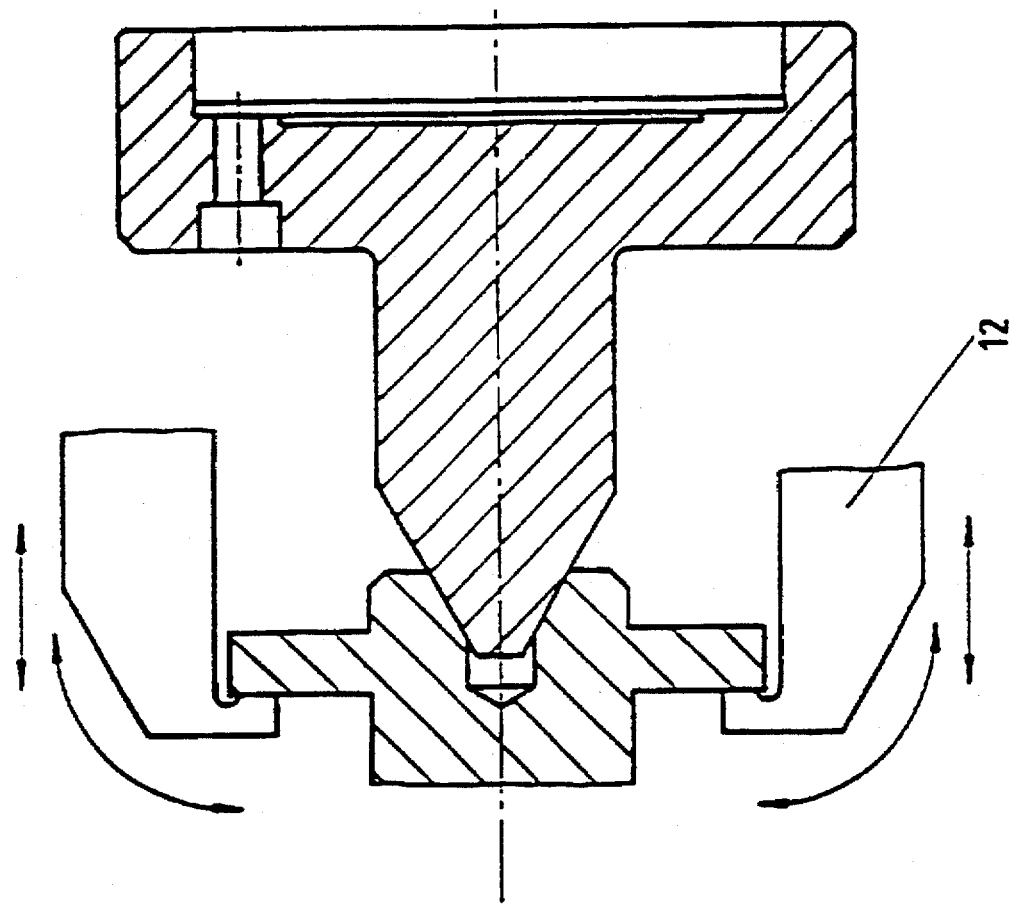
FIG. 5 shows a partial sectional view of the apparatus with an external fastening element.

Referring to FIG. 5, a further fastening element 12 can be disposed at the headstock end 16 and the tailstock end 17 of the crankshaft 15. In the case of the embodiment of the inventive apparatus shown in FIG. 5, this fastening element 12 is disposed at a flange of the crankshaft 15. The fastening apparatus or the fastening element 12 pulls and clamps the crankshaft 15 essentially axially to the crankshaft axis and in the direction of the workpiece headstock adjacent to the end of the crankshaft 15 or, if the fastening apparatus 12 is disposed at the tailstock end of the crankshaft 15, in the direction of the tailstock 13. The fastening element 12 grips behind the respective end flange of the crankshaft 15 and clamps it against the assigned spike 3 or 14.

FIG. 6 shows a further embodiment of the apparatus assigned to a grinding tool 19, which can be positioned at different sites. In the case of the embodiments shown in FIGS. 6(a) to (d), in each case a catch 18, constructed as a spike, connects the workpiece headstock 2 with the crankshaft 15 or the tailstock 13 with the crankshaft 15, against which it lies. The spikes 18 can connect the workpiece headstock 2 and the crankshaft 15 as well as the crankshaft 15 and the tailstock 13. The spikes 18 can be shifted horizontally, parallel to the axis of the crankshaft. The spikes 18 can be inserted depending on the respective positioning of the grinding tool 19. The spike 18 is extended between the workpiece headstock 2 and the crankshaft 15 especially when the grinding tool 19 is positioned at the tailstock end of the crankshaft (FIG. 6b). On the other hand, when the grinding tool 19 is positioned at the headstock end of the crankshaft 15, the spike 18 is inserted between the crankshaft 15 and the tailstock 13 (FIG. 6c). These spikes 18 engage the crankshaft 15 at their crankarms, against which they lie. Components, which engage the crankarms of the crankshaft 15 positively, can also be used as spikes 18; these components can then be swiveled out of the way, when the crankshaft is to be ground in this region.

Finally, it should be emphasized that, with the method given, it is possible for the first time to complete the grinding particularly of a crankshaft on one and the same grinding machine in consecutive steps in the one clamping of the workpiece, using the necessary grinding disks, without the exertion of axial compression forces acting on the crankshaft. This results in an appreciable lowering of the manufacturing costs as well as in an appreciable increase in the accuracy, since the previously required repeated clamping and unclamping is omitted.

I claim:

1. A method for grinding a crankshaft, comprising the steps of:

clamping the crankshaft at respective opposing ends using clamping spikes of the workpiece headstock and tailstock of a grinding machine, where said clamping spike independently clamp said respective opposing ends by use of radial forces such that said crankshaft is substantially free of axial compressive forces; and grinding all bearings, lifting bearings, flanges, crankpins and end surfaces of the crankshaft using at least two grinding disks while said crankshaft remains clamped as by said clamping spikes.

2. An apparatus for grinding a crankshaft, the apparatus comprising:

a workpiece headstock and a tailstock;

the workpiece headstock and tailstock each having a spike for engaging a centering borehole at each end of the crankshaft; and said workpiece headstock and tailstock each including clamping means for clamping the crankshaft between the workpiece headstock and tailstock while applying axial tension to said crankshaft.

3. The apparatus of claim 2, wherein said clamping means includes at least the spike of the workpiece headstock having an axially extending borehole within which is a connecting rod that shiftable axially in the spike, a clamping element means for pressing against an inner wall of the centering borehole of the crankshaft and pulling the crankshaft in axial direction against the spike in response to axial motion of said connecting rod.

4. The apparatus of claim 3, wherein said clamping element means includes clamping jaws circumferentially disposed about an end of said connecting rod.

5. The apparatus of claim 3, wherein said clamping element means includes clamping balls circumferentially disposed about an end of said connecting rod.

6. The apparatus of one of the claims 3 to 5, wherein the connecting rod has a conical end section in the region of the clamping element means for effecting radial expansion of said clamping element means.

7. The apparatus of claim 2, further comprising catching members for connecting the crankshaft to at least one of the workpiece headstock and the workpiece tailstock and which are disposed parallel to the crankshaft axis.

8. The apparatus of claim 7, wherein the catching members are slidable in an axial direction of the crankshaft.

9. The apparatus of claim 7 or 8, wherein the catching members are pins.

10. The apparatus of claim 2, further comprising a fastening means for pressing perpendicular to the axis of the crankshaft at at least a respective one of the ends of the crankshaft disposed at a respective one of the headstock and the tailstock.

11. The apparatus of claim 10, wherein the fastening means includes pivoting jaw members which which encompass said respective one of the ends of the crankshaft and pull said crankshaft against the spike of the respective one of the headstock and tailstock.

12. The apparatus of claim 2 wherein said clamping means includes pivotable clamping jaws for engaging a flange on at least one of said ends of the crankshaft in a direction substantially parallel to the crankshaft axis and in a direction toward a respective one of the workpiece headstock and tailstock adjacent to the respective end of the crankshaft, gripping behind the flange to clamp the respective end of the crankshaft against a respective one of the spikes.

* * * * *